(12) United States Patent
Juels et al.

(10) Patent No.: US 9,015,476 B1
(45) Date of Patent: Apr. 21, 2015

(54) CRYPTOGRAPHIC DEVICE OPERABLE IN A CHALLENGE-RESPONSE MODE

(71) Applicants: Ari Juels, Brookline, MA (US); Guoying Luo, Lexington, MA (US); Kevin D. Bowers, Melrose, MA (US)

(72) Inventors: Ari Juels, Brookline, MA (US); Guoying Luo, Lexington, MA (US); Kevin D. Bowers, Melrose, MA (US)

(73) Assignee: EMC Corporation, Hopkinton, MA (US)

( * ) Notice: Subject to any disclaimer, the term of this patent is extended or adjusted under 35 U.S.C. 154(b) by 193 days.

(21) Appl. No.: 13/708,322

(22) Filed: Dec. 7, 2012

(51) Int. Cl.
*H04L 9/34* (2006.01)
*G06F 21/34* (2013.01)

(52) U.S. Cl.
CPC ...................................... *G06F 21/34* (2013.01)

(58) Field of Classification Search
CPC ....... G06F 21/30; G06F 21/34; G06F 21/445; G06Q 20/3674; G06Q 20/409; H04L 9/3271; H04L 9/3273; H04L 63/0853
USPC .................. 713/159, 172, 184, 185; 726/9, 20
See application file for complete search history.

(56) References Cited

U.S. PATENT DOCUMENTS

| | | | |
|---|---|---|---|
| 5,627,355 A * | 5/1997 | Rahman et al. ............... | 235/380 |
| 6,671,808 B1 * | 12/2003 | Abbott et al. ..................... | 726/4 |
| 2003/0221102 A1 * | 11/2003 | Jakobsson et al. ............ | 713/171 |
| 2007/0220597 A1 * | 9/2007 | Ishida .............................. | 726/8 |
| 2008/0098464 A1 * | 4/2008 | Mizrah ............................. | 726/5 |
| 2008/0276098 A1 * | 11/2008 | Florencio et al. ............. | 713/183 |

* cited by examiner

*Primary Examiner* — Eleni Shiferaw
*Assistant Examiner* — Paul Callahan
(74) *Attorney, Agent, or Firm* — Ryan, Mason & Lewis, LLP

(57) ABSTRACT

Methods, apparatus and articles of manufacture for implementing cryptographic devices operable in a challenge-response mode are provided herein. A method includes storing a set of authentication information in a first cryptographic device associated with a user, receiving a challenge in the first cryptographic device in connection with a user authentication request responsive to a request from the user to access a protected resource, wherein the challenge comprises an index of at least one non-sequential portion of the authentication information stored in the first cryptographic device, and outputting a non-sequential portion of the authentication information from the set of authentication information stored in the first cryptographic device in response to the challenge for use in authenticating the user.

19 Claims, 3 Drawing Sheets

CRYPTOGRAPHIC DEVICE OPERABLE IN A CHALLENGE-RESPONSE MODE

FIELD

The field relates generally to cryptography, and more particularly, to authenticating one or more users over a network or in other types of communication systems.

BACKGROUND

In order to gain access to applications or other resources via a computer or another user device, users are often required to authenticate themselves by entering authentication information. Such authentication information may include, for example, passwords that are generated by a security token carried by a user. These passwords may be, for example, one-time passwords that are generated using a time-synchronous or event-based algorithm.

In most existing token-based user authentication systems, a token belonging to a user U generates a one-time passcode for consumption by a single server S. In a symmetric-key-based scheme, secret cryptographic keys from the token are shared with an authentication server. In symmetric-key-based schemes, however, an adversary that compromises server S can impersonate user U by stealing the user's credentials from server S. Such an attack requires only transient server compromise; that is, the adversary need only learn the state of server S, and need not alter the operation of server S. In other attacks, the adversary can control the operation of server S over an extended period of time. Such an adversary can subvert the authentication process, impersonating user U even if the user's credentials are periodically refreshed, and even if authentication relies on public-key operations.

Some user authentication systems include the use of challenge-response tokens, which can store, for example, a secret key $\kappa$. In such a system, in response to a challenge c, the token outputs a response $r = f(\kappa; c)$, for some cryptographic function $f$ (for example, a hash function).

Additionally, other user authentication systems can include the use of stored-passcode (SP) tokens. In contrast to challenge-response tokens noted above, an SP token is pre-loaded with a collection of passcodes $P_1, \ldots, P_n$. In such a system, in response to an input t, the token outputs $P_t$. By way of example, the value t can represent the current time (as determined by an internal or external clock) or a counter value maintained by the token.

An SP token can offer advantages over a token that computes passcodes on-the-fly. For example, SP tokens require little computation, and thus require minimal computational circuitry and draw small amounts of power. This can render SP tokens an attractive design option for stand-alone authentication devices. Also, SP tokens can avoid vulnerabilities to side-channel attacks associated with online cryptographic computation, an attractive feature for many tokens, including tokens that are to be implemented in a general-purpose computational device (such as a mobile phone, for example).

SP tokens, on the other hand, do not perform online computation. Accordingly, SP tokens cannot operate in a conventional challenge-response mode, and challenge-response authentication schemes can carry security advantages over counter-based schemes that are vulnerable to passcode harvesting and re-use by attackers. Challenge-response authentication schemes, moreover, can be preferable to time-based schemes in that challenge-response authentication schemes avoid the need for the authentication token to maintain the current time and provide reliable synchronization with authentication servers.

Consequently, a need exists for enabling SP tokens capable of operating in a challenge-response mode.

SUMMARY

One or more illustrative embodiments of the present invention provide challenge-response mode cryptographic devices and implementations thereof.

In accordance with an aspect of the invention, a method is provided for implementing a cryptographic device operable in a challenge-response mode. The method comprises the steps of: storing a set of authentication information in a first cryptographic device associated with a user, receiving a challenge in the first cryptographic device in connection with a user authentication request responsive to a request from the user to access a protected resource, wherein the challenge comprises an index of at least one non-sequential portion of the authentication information stored in the first cryptographic device, and outputting a non-sequential portion of the authentication information from the set of authentication information stored in the first cryptographic device in response to the challenge for use in authenticating the user.

In accordance with another aspect of the invention, a method is provided that comprises the steps of: issuing a challenge to a first cryptographic device in connection with a user authentication request responsive to a request from the user to access a protected resource, wherein the challenge comprises an index of at least one non-sequential portion of the authentication information stored in the first cryptographic device, and authenticating the user by verifying an output of a non-sequential portion of the authentication information from the set of authentication information stored in the first cryptographic device, wherein said output is provided by the first cryptographic device in response to the challenge.

The techniques for enabling cryptographic devices to operate in a challenge-response mode of the illustrative embodiments overcome one or more of the problems associated with the conventional techniques described previously, and provide protection against multiple server-side intrusions across time while requiring minimal computing circuitry and power consumption. These and other features and advantages of the present invention will become more readily apparent from the accompanying drawings and the following detailed description.

DETAILED DESCRIPTION

As will be described herein, the present invention, in one or more illustrative embodiments, provides challenge-response stored-passcode (SP) authentication tokens. As noted herein, an SP authentication token is a token that is loaded with pre-computed passcodes and releases those pre-computed passcodes, rather than computing and releasing passcodes on-the-fly. One or more embodiments of the invention, accordingly, include providing a scheme that permits SP tokens to operate in a challenge-response mode. At least one embodiment of the invention also includes supporting SP tokens that operate in a distributed setting with proactivization; that is, periodic re-randomization of token keys to protect against multiple server-side intrusions over time.

Illustrative embodiments of the present invention will be described herein with reference to exemplary communication systems and associated processing devices. It is to be appreciated, however, that embodiments of the invention are not restricted to use with the particular illustrative system and device configurations shown.

Accordingly, the term "communication system," as used herein, is intended to be broadly construed so as to encompass any type of system in which multiple processing devices can communicate with one another. Also, the term "cryptographic device," as used herein, is intended to be construed broadly so as encompass any type of processing device that incorporates cryptographic functionality (such as a computer, server, mobile telephone, radio-frequency identification (RFID) tag or reader, authentication token, etc.). Similarly, the term "authentication server" should be understood to encompass any type of processing device or set of such devices that is operative to authenticate a passcode provided by an authentication token or other type of cryptographic device. As used herein, an "authentication server" need not be a network-based server, and may be implemented as a portion of a device that performs other functions, as a combination of multiple servers or other devices, or in other forms.

Additionally, the term "authentication information," as used herein, is intended to include passwords, passcodes, answers to life questions, or other authentication credentials, or values derived from such authentication credentials, or more generally any other information that a user may be required to submit in order to obtain access to an access-controlled application or protected resource. Similarly, the term "passcode," as used herein, is intended to include authentication information such as one-time passcodes (OTPs), or more generally any other information that may be utilized for cryptographic authentication purposes.

Figure 1:
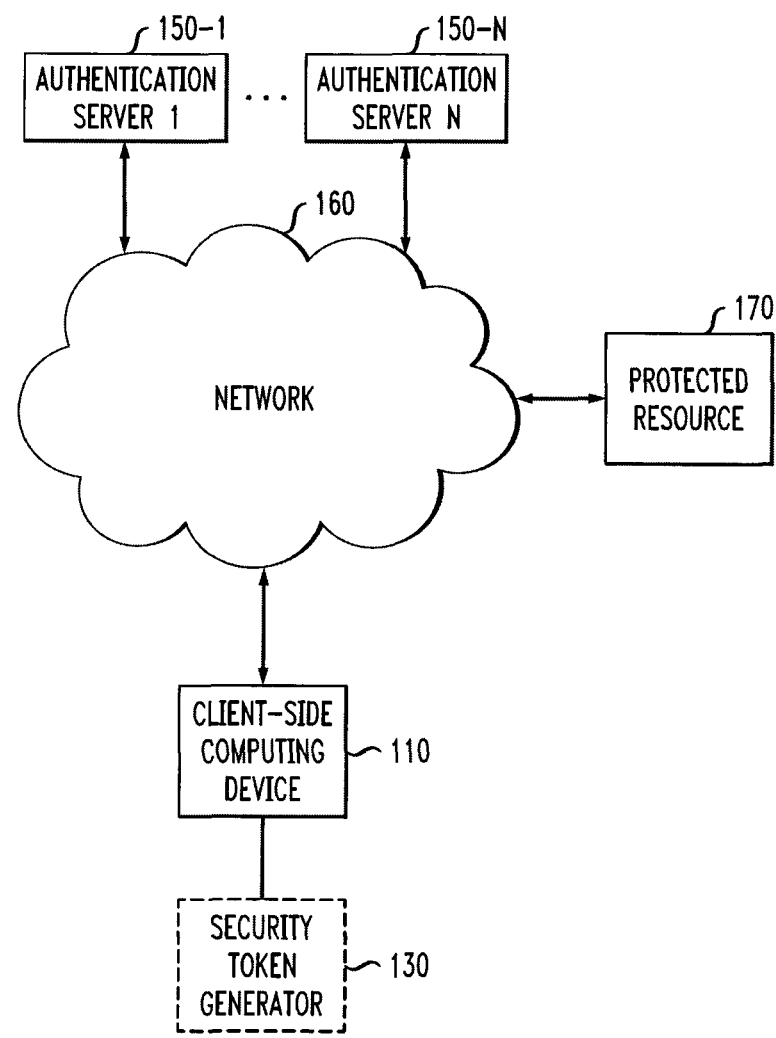
FIG. 1 is a diagram illustrating an example network environment in which one or more embodiments of the present invention can operate.

FIG. 1 illustrates an example client-side computing device (CSCD) 110 communicating with a protected resource 170 over a network 160. In an example implementation, a user must authenticate with one or a plurality of authentication servers 150-1 through 150-N (hereinafter, collectively referred to as authentication servers 150) using a token generated by a security token generator 130 (hereinafter, referred to as security token 130) before obtaining access to the protected resource 170.

As indicated in at least one example embodiment of the invention described herein, two exemplary authentication servers 150 are denoted "Blue" and "Red." The network 160, may comprise, for example, a global computer network such as the Internet, a wide area network (WAN), a local area network (LAN), a satellite network, a telephone or cable network, or various portions or combinations of these and other types of networks.

According to one example embodiment of the invention, the user of the CSCD 110 is authenticated using a one-time passcode generated by the security token generator 130 by authentication servers 150. The exemplary communications among the system elements 110, 130, 150 and 170 of FIG. 1 to achieve joint authentication by the authentication servers 150 is discussed further below.

It is to be appreciated that a given embodiment of the disclosed system may include multiple instances of CSCD 110, security token 130 and protected resource 170, and possibly other system components, although only single instances of such components are shown in the simplified system diagram of FIG. 1 for clarity of illustration.

Further, as used herein, the term "session" with a protected resource 170 shall mean an interactive information interchange between a CSCD 110 and the protected resource 170.

The security token 130 is shown in FIG. 1 as being separate from and electrically connected to the CSCD 110. The security token 130 may be implemented, for example, using the RSA SecurID® user authentication token commercially available from RSA Security Inc. of Bedford, Mass., U.S.A. The security token 130 may be a server or other type of module that is accessible over the network 160, or it may be a software component resident on the CSCD 110. As another alternative, security token 130 may be distributed over multiple devices, one of which may be the CSCD 110.

Accordingly, while at least one embodiment of the present invention is illustrated herein using a security token 130 electrically connected to the CSCD 110, such that the CSCD 110 can read a given token code (or another authentication value) directly from the token 130, other implementations are within the scope of the present invention, as would be apparent to a person of ordinary skill in the art. By way of example, for security tokens 130 that are not connectable to a computer or other user device in this manner, the user may manually enter a password or another value displayed by the token 130 at the time of the attempted access.

The CSCD 110 may represent a portable device, such as a mobile telephone, personal digital assistant (PDA), wireless email device, game console, etc. The CSCD 110 may alternatively represent a desktop or laptop personal computer (PC), a microcomputer, a workstation, a mainframe computer, a wired telephone, a television set top box, or any other information processing device which can benefit from the use of authentication techniques in accordance with the invention.

The CSCD 110 may also be referred to herein as simply a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password or other authentication information described as being associated with a user may, for example, be associated with a CSCD device 110, a person utilizing or otherwise associated with the device, or a combination of both the person and the device.

As also depicted in FIG. 1, the authentication servers 150 are typically associated with a third party entity, such as an authentication authority, that processes authentication requests on behalf of web servers and other resources, as well as verifies the authentication information that is presented by a CSCD 110.

Further, the protected resource 170 may be, for example, an access-controlled application, web site or hardware device. In other words, a protected resource 170 is a resource that grants user access responsive to an authentication process, as will be described in greater detail below. The protected resource 170 may be, for example, a remote application server such as a web site or other software program or hardware device that is accessed by the CSCD 110 over a network 160.

In view thereof, a token, in accordance with at least one embodiment of the invention, stores a set of passcodes $P_1, \ldots, P_n$. Such passcodes may be random or the passcodes may be pseudorandom. By way of example, passcodes can be computed as $\{P_i = f(\kappa, i)\}_{i=1}^n$, wherein $\kappa$ represents a secret key and $f$ represents a cryptographic function. In such an instance, an authentication server would need only to store $\kappa$ to verify submitted passcodes.

Additionally, in at least one embodiment of the invention, a challenge takes the form of a passcode index c. As used herein, a passcode index is a unique value associated with a passcode. By way of example, in at least one embodiment of the invention, passcode indices can be sequential (for example, the indices run form 1 to n.) As such, on input c, the token outputs passcodes $P_c$. Additionally, one or more embodiments of the invention can include aspects such as erasure to bound use and detect harvesting attacks, enforcement of challenge uniqueness, and proactivization. Such aspects are described in further detail below.

With respect to an erasure feature of an embodiment of the invention, benefits can be derived from the token erasing $P_c$ after emitting $P_c$ in response to a challenge c, or replacing $P_c$ with a filler passcode (as potentially stored on the token). Such example benefits may include, as noted, bounding use and detecting harvesting attacks.

Accordingly, implementation of an aspect of the invention that erases or replaces $P_c$ can prevent challenge reuse and bound the useable lifetime of a token, which permits enforcement of token expiration. Additionally, a potential attacker may attempt to clone a token by harvesting some number of passcodes. While passcode erasure may not, in and of itself, prevent such harvesting outright, implementation of an erasure feature facilitates detection of such harvesting. For instance, when the server challenges the user with an index c against which the potential attacker has performed harvesting, the user will experience an authentication failure. A filler passcode can also facilitate such detection, as the filler passcode will constitute a proof of challenge reuse.

As also described herein, at least one embodiment of the invention includes enforcing challenge uniqueness. By way of illustration, if the server selects a challenge randomly, that is, chooses $c \in_R \{1, \ldots, n\}$, then the server may periodically reissue challenges. Accordingly, one or more embodiments of the invention can include implementing multiple techniques such that the server can ensure against challenge reuse.

One such technique includes recording issued challenges, wherein the server can store the challenges that it (that is, the server) has issued. Such storage aims to ensure against challenge reuse. As such, for example, a randomly generated challenge would not be issued if present on a recorded list of issued challenges.

Another such technique includes pseudorandom permutation. Accordingly, in at least one embodiment of the invention, the server can assign to each token a pseudorandom permutation $\Phi: \{1, \ldots, n\} \leftrightarrow \{1, \ldots, n\}$ and store a token-specific counter value $\gamma \in Z_n$, initialized at 0. Given a current counter value $\gamma$, the server can issue challenge $c = \Phi(\gamma)$ and increment $\gamma$. In at least one embodiment of the invention, both of the above techniques (that is, recording issued challenges and pseudorandom permutation) are implemented. Accordingly, for example, if a server issues what it believes to be a fresh or unused challenge and the device indicates that the corresponding challenge-response pair has been erased, the server learns that the token was inappropriately accessed.

As also detailed herein, one or more embodiments of the invention can include proactivization, a security enhancement that can be implemented, for example, in distributed authentication systems. By way of illustration, in a distributed authentication system, an authentication token's emissions are verified collectively by a subset of at least k servers among a distributed set of n servers. Such a system is referred to as a k-out-of-n authentication system.

Typically, in such a system, a token stores multiple seeds (also referred to herein as secret keys $\kappa$). For example, in a (2, 2)-authentication system, with two servers, denoted as Blue and Red, a token might store two seeds, $\kappa_{blue}$ and $\kappa_{red}$. Accordingly, the Blue server stores $\kappa_{blue}$ and the Red Server stores $\kappa_{red}$. In response to input t (the current time, a counter value, or a challenge), the token computes a response and/or passcode $P_t = f(\kappa_{blue}, \kappa_{red}; t)$ for verification by the two servers. To verify a submitted passcode $P'_t$, the two servers can compute an expected passcode $P_t = f(\kappa_{blue}, \kappa_{red}; t)$, and either explicitly or in a distributed manner, confirm that $P'_t = P_t$.

Additionally, to prevent exposure of one server's key to that of the other server, f can be constructed as the composition of two functions on individual keys. By way of example, $f(\kappa_{blue}, \kappa_{red}; t) = f_{blue}(\kappa_{blue}; t) \oplus f_{red}(\kappa_{red}; t)$, for some operator $\oplus$. By way of example, the XOR operator can be used.

Additionally, proactivization can be a mechanism for enforcing key expiration. In continuing with the example above, the keys $\kappa_{red}$ and $\kappa_{blue}$ are only valid for a given interval, referred to herein as an epoch. At the end or completion of the epoch, the keys $\kappa_{red}$ and $\kappa_{blue}$ are modified on both the token and by the servers. By way of illustration, let $\kappa_{blue}^{(e)}$ and $\kappa_{red}^{(e)}$ denote Blue and Red keys valid for epoch e. Additionally, for example, assume that $K_{blue}^{(e+1)} = h(\text{"blue"}, \kappa_{blue}^{(e)}, h(\text{"d.red"}, \kappa_{red}^{(e)}))$, where h is a cryptographic hash function. As such, the two servers can jointly compute updates to their respective keys without revealing key values directly to one another. (The functions $f_{blue}$ and $f_{red}$, in this case, are to be forward-secure.) Further, the token can compute such updates locally.

Pre-computing and storing passcodes for distributed and proactive authentication systems can, generally, be implemented for time- and counter-based tokens. Additionally, for challenge-response tokens, one or more embodiments of the invention include partitioning passcodes into epochs, as further described below.

Accordingly, a challenge-response mode with proactivization can be implemented within each of multiple epochs. Additionally, at least one embodiment of the invention includes techniques for advancing epochs on a token, as well as synchronizing epochs between a token and a server. Advancing to the next epoch of passcodes on a token can include, for example, passcode exhaustion, simple server-side signaling, authenticated server-side signaling, and the use of time-based epochs.

With respect to passcode exhaustion, the token advances to epoch e+1 when the token has been challenged on and emitted all passcodes for epoch e. With respect to simple server-side signaling, the token advances to epoch e+1 when the token receives a fixed challenge value, such as, for example, c=n+1. By way of example, the fixed challenge value can be selected at initialization time, that is, when passcodes are loaded into the token and server. A randomly selected code can help prevent spurious server signaling.

Additionally, with respect to authenticated server-side signaling, the token advances to the next epoch (e+1) upon receiving an epoch-specific stored secret $s_e$ for epoch e. Such authentication of an epoch-advance request also prevents denial-of service attacks against the token. Further, with respect to the use of time-based epochs, each epoch lasts for a pre-determined period of time, automatically completing at the end of that pre-determined duration. Upon said completion, the token advances to the next epoch.

With passcode exhaustion and simple server-side signaling, there can exist a non-negligible risk of benign de-synchronization between the token and server. In the case of passcode exhaustion, challenges issued by the server may fail to reach the token due to reasons such as, for example, the token owner failing to key-in the challenges. In such an instance, the token's epoch may lag behind that of the server. In one or more embodiments of the invention, such a lag may be detected by the server with recorded epoch e+1 by determining whether a received passcode (or filler value) corresponds to the previous epoch e.

Also, in the case of both passcode exhaustion and simple server-side signaling, an attacker can potentially cause a token to advance to a future epoch by performing a denial-of-service attack. By way of example, the attacker can issue challenges to the token to deplete unused challenges in the current epoch. However, similar to above, one or more embodiments of the invention include enabling the server to ascertain such de-synchronization for testing ostensibly invalid passcodes against passcode values for future epochs.

In accordance with one or more embodiments of the invention, implementation of authenticated server-side signaling provides protection against denial-of-service attacks and benign de-synchronization, but also includes enlarging the space of possible challenge values for the token. In cases where challenges are keyed-in or entered manually by a user, use of authenticated server-side signaling may require the user to key-in one or more extra digits—at least when an epoch-specific stored secret $s_e$ is to be entered.

Additionally, one or more embodiments of the invention include facilitating server detection of de-synchronization by embedding an epoch-specific hint in passcodes. By way of example, passcodes for even-numbered epochs might be tagged with a '0' bit, while passcodes for odd-numbered epochs might be tagged with a '1' bit.

Also, when deployed in isolation, the use of time-based epochs can lead to vulnerability to denial-of-service attacks. By way of illustration, an attacker can exhaust the passcodes associated with a designated epoch, rendering the token unusable until the next epoch. However, as a counter-measure, one or more embodiments of the invention can include incorporating generous provisioning of passcodes per epoch and/or enhancement of time-based epochs with simple server-side signaling and/or authenticated server-side signaling.

Additionally, depending on how challenges flow from servers to a token, a malicious server may be able to disable a token permanently by advancing the token through all epochs. Passcode exhaustion and the use of time-based epochs, for example, can provide resistance to such attacks. Similarly, a configuration in which a trustworthy front-end entity issues a challenge only if it is jointly authenticated by a quorum of servers can also provide resistance to such attacks.

Figure 2:
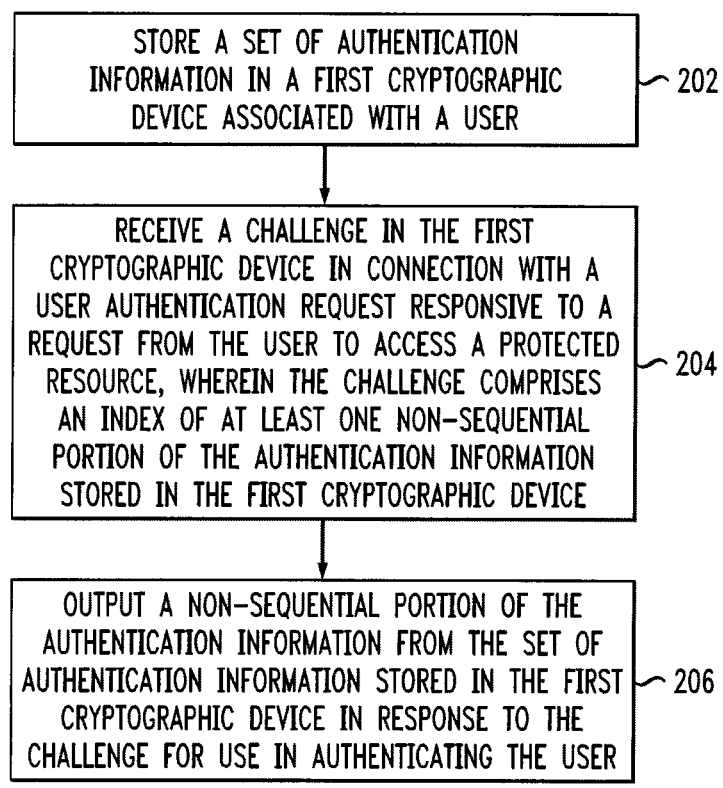
FIG. 2 is a flow diagram illustrating techniques for implementing a cryptographic device operable in a challenge-response mode, according to an embodiment of the invention.

FIG. 2 is a flow diagram illustrating techniques for implementing a cryptographic device operable in a challenge-response mode, according to an embodiment of the present invention. Step 202 includes storing a set of authentication information in a first cryptographic device associated with a user. The first cryptographic device can include a stored-passcode authentication token, wherein said stored-passcode authentication token is loaded with a set of pre-computed passcodes. The first cryptographic device can be a hardware component or a software component resident on a device.

As described herein, the authentication information can include passcodes. By way of example, the passcodes can include a set of random passcodes and/or a set of pseudo-random passcodes. Also, the passcodes can be computed as $\{P_i = f(\kappa, i)\}_{i=1}^n$, wherein $\kappa$ represents a secret key shared between the authentication token and an authentication authority, and $f$ represents a cryptographic function.

Step 204 includes receiving a challenge in the first cryptographic device in connection with a user authentication request responsive to a request from the user to access a protected resource, wherein the challenge comprises an index of at least one non-sequential portion of the authentication information stored in the first cryptographic device. Step 206 includes outputting a non-sequential portion of the authentication information from the set of authentication information stored in the first cryptographic device in response to the challenge for use in authenticating the user.

As also detailed herein, the techniques depicted in FIG. 2 can additionally include eradicating the non-sequential portion of the authentication information outputted by the first cryptographic device in response to the challenge after the first cryptographic device emits the portion of the authentication information in response to the challenge. Further, the non-sequential portion of the authentication information outputted in response to the challenge can be replaced in the first cryptographic device with filler authentication information after the first cryptographic device emits the authentication information.

The techniques depicted in FIG. 2 can also include assigning a pseudo-random permutation to the first cryptographic device, storing a cryptographic device-specific counter value in a second cryptographic device, and receiving one or more subsequent challenges that are issued incrementally by the second cryptographic device based on the token-specific counter value. Further, at least one embodiment of the invention includes incorporating a secret key shared between the first cryptographic device and multiple additional cryptographic devices, wherein the secret key is only valid for a predetermined interval of time. The key can be modified on the authentication token and multiple authentication authorities upon completion of the predetermined interval of time.

Additionally, as detailed herein, the authentication information can be partitioned in the first cryptographic device into one or more epochs; that is, a predetermined interval (for example, interval of time). At least one embodiment of the invention can include advancing to a subsequent epoch in the first cryptographic device when the first cryptographic device has been challenged on and emitted all authentication information for a current epoch. Also, advancing to a subsequent epoch on the first cryptographic device can occur when the first cryptographic device receives a particular fixed challenge value, upon receiving an epoch-specific stored secret for a current epoch, and/or via use of time-based epochs, wherein each epoch lasts for a pre-determined period of time.

Further, at least one embodiment of the invention can include facilitating server detection of de-synchronization between the first cryptographic device and a second cryptographic device (for example, an authentication authority) by embedding an epoch-specific hint in the authentication information in the first cryptographic device.

Figure 3:
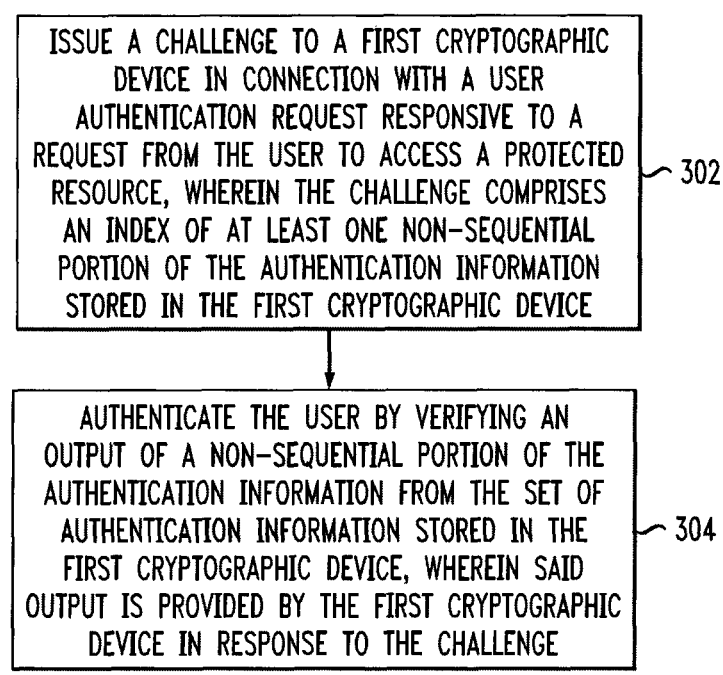
FIG. 3 is a flow diagram illustrating techniques for implementing a cryptographic device operable in a challenge-response mode, according to an embodiment of the present invention.

FIG. 3 is a flow diagram illustrating techniques for implementing a cryptographic device operable in a challenge-response mode, according to an embodiment of the present invention. Step 302 includes issuing a challenge to a first cryptographic device in connection with a user authentication request responsive to a request from the user to access a protected resource, wherein the challenge comprises an index of at least one non-sequential portion of the authentication information stored in the first cryptographic device.

Step 304 includes authenticating the user by verifying an output of a non-sequential portion of the authentication information from the set of authentication information stored in the first cryptographic device, wherein said output is provided by the first cryptographic device in response to the challenge. Verification the output can include collective verification by a subset of at least k cryptographic devices among a distributed set of n additional cryptographic devices, wherein each additional cryptographic device can include an authentication authority.

Additionally, as detailed herein, the techniques depicted in FIG. 3 can also include maintaining a record of each issued challenge.

Figure 4:
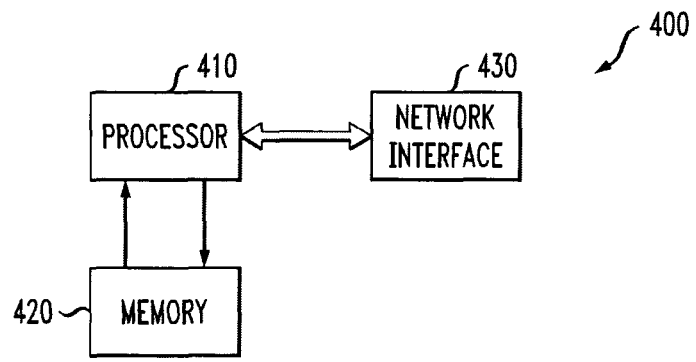
FIG. 4 illustrates one possible implementation of a given client-side computing device, authentication authority, protected resource or another processing device of the example network environment of FIG. 1.

FIG. 4 illustrates one possible implementation of a given client-side computing device, authentication authority, protected resource or another processing device of the example network environment of FIG. 1. The processing device 400 as shown may be viewed as representing, for example, CSCD 110, security token generator 130, authentication servers 150 and protected resource 170. The processing device 400 in this implementation includes a processor 410 coupled to a memory 420 and a network interface 430. These device elements may be implemented in whole or in part as a conventional microprocessor, digital signal processor, application-specific integrated circuit (ASIC) or other type of circuitry, as well as portions or combinations of such circuitry elements.

As will be appreciated by those skilled in the art, portions of an authentication technique in accordance with an embodiment of the invention can be implemented at least in part in the form of one or more software programs that are stored in memory 420 and executed by the corresponding processor 410. The memory 420 is also used for storing information used to perform computations or other operations associated with the disclosed authentication on techniques.

It should again be emphasized that the above-described embodiments of the present invention are presented for purposes of illustration only. Many variations and other alternative embodiments may be used. By way of example, the techniques are applicable to a wide variety of other types of communication systems and cryptographic devices that can benefit from challenge-response stored-passcode authenticated tokens. Accordingly, the particular illustrative configurations of system and device elements detailed herein can be varied in other embodiments. These and numerous additional alternative embodiments within the scope of the appended claims will be readily apparent to those skilled in the art.

What is claimed is:

1. A method comprising:
   storing a set of authentication information in a first cryptographic device associated with a user;
   receiving a challenge in the first cryptographic device in connection with a user authentication request responsive to a request from the user to access a protected resource, wherein the challenge comprises an index of at least one non-sequential portion of the authentication information stored in the first cryptographic device;
   outputting the at least one non-sequential portion of the authentication information from the set of authentication information stored in the first cryptographic device in response to the challenge for use in authenticating the user;
   replacing the at least one non-sequential portion of the authentication information in the first cryptographic device with one or more items of filler information subsequent to said outputting.

2. The method of claim 1, wherein the first cryptographic device comprises a stored-passcode authentication token, wherein said stored-passcode authentication token is loaded with a set of pre-computed passcodes.

3. The method of claim 1, wherein the first cryptographic device comprises a hardware component or a software component resident on a device.

4. The method of claim 1, wherein the set of authentication information comprises one or more passcodes.

5. The method of claim 4, wherein the one or more passcodes comprise a set of random passcodes and/or a set of pseudo-random passcodes.

6. The method of claim 1, further comprising:
   eradicating the at least one non-sequential portion of the authentication information outputted by the first cryptographic device in response to the challenge after the first cryptographic device emits the at least one non-sequential portion of the authentication information in response to the challenge.

7. The method of claim 1, further comprising:
   assigning a pseudo-random permutation to the first cryptographic device;
   storing a cryptographic device-specific counter value in a second cryptographic device; and
   receiving one or more subsequent challenges that are issued incrementally by the second cryptographic device based on a token-specific counter value.

8. The method of claim 1, further comprising:
   partitioning the set of authentication information in the first cryptographic device into one or more epochs, wherein an epoch is a predetermined interval.

9. The method of claim 8, further comprising:
   advancing to a subsequent epoch in the first cryptographic device when the first cryptographic device has been challenged on and emitted all authentication information for a current epoch.

10. The method of claim 8, further comprising:
    advancing to a subsequent epoch in the first cryptographic device when the first cryptographic device receives a particular fixed challenge value.

11. The method of claim 8, further comprising:
    advancing to a subsequent epoch in the first cryptographic device upon receiving an epoch-specific stored secret for a current epoch.

12. The method of claim 8, further comprising:
    advancing to a subsequent epoch in the first cryptographic device via use of time-based epochs, wherein each epoch lasts for a pre-determined period of time, and the first cryptographic device advances to the subsequent epoch automatically upon completion of the pre-determined period of time associated with a current epoch.

13. The method of claim 8, further comprising:
    facilitating detection of de-synchronization between the first cryptographic device and a second cryptographic device by embedding an epoch-specific hint in the set of authentication information in the first cryptographic device.

14. An article of manufacture comprising a non-transitory processor-readable storage medium having processor-readable instructions tangibly embodied thereon which, when implemented, cause a processor to carry out the steps of the method of claim 1.

15. An apparatus comprising a cryptographic device, comprising:
    a memory; and
    at least one processor coupled to the memory and operative for:

storing a set of authentication information in a first cryptographic device associated with a user;

receiving a challenge in the first cryptographic device in connection with a user authentication request responsive to a request from the user to access a protected resource, wherein the challenge comprises an index of at least one non-sequential portion of the authentication information stored in the first cryptographic device;

outputting the at least one non-sequential portion of the authentication information from the set of authentication information stored in the first cryptographic device in response to the challenge for use in authenticating the user;

replacing the at least one non-sequential portion of the authentication information in the first cryptographic device with one or more items of filler information subsequent to said outputting.

16. A method comprising:

issuing a challenge to a first cryptographic device in connection with a user authentication request responsive to a request from the user to access a protected resource, wherein the challenge comprises an index of at least one non-sequential portion of the authentication information stored in the first cryptographic device;

granting the user authentication request upon verifying an output of the at least one non-sequential portion of the authentication information from the set of authentication information stored in the first cryptographic device, wherein said output of the at least one non-sequential portion of the authentication information is provided by the first cryptographic device in response to the challenge; and rejecting the user authentication request upon detecting an output of one or more items of filler information provided by the first cryptographic device in response to the challenge, wherein said one or more items of filler information comprise one or more items of information that replaced the at least one non-sequential portion of the authentication information in the first cryptographic device subsequent to a previous response to the challenge provided by the first cryptographic device.

17. The method of claim 16, further comprising:

maintaining a record of each issued challenge.

18. The method of claim 16, wherein said verifying comprises collective verification by a subset of at least k cryptographic devices among a distributed set of n additional cryptographic devices.

19. An apparatus comprising a cryptographic device, comprising:

a memory; and at least one processor coupled to the memory and operative for:

issuing a challenge to a first cryptographic device in connection with a user authentication request responsive to a request from the user to access a protected resource, wherein the challenge comprises an index of at least one non-sequential portion of the authentication information stored in the first cryptographic device;

granting the user authentication request upon verifying an output of the at least one non-sequential portion of the authentication information from the set of authentication information stored in the first cryptographic device, wherein said output of the at least one non-sequential portion of the authentication information is provided by the first cryptographic device in response to the challenge; and rejecting the user authentication request upon detecting an output of one or more items of filler information provided by the first cryptographic device in response to the challenge, wherein said one or more items of filler information comprise one or more items of information that replaced the at least one non-sequential portion of the authentication information in the first cryptographic device subsequent to a previous response to the challenge provided by the first cryptographic device.

\* \* \* \* \*